United States Patent
Tanimoto et al.

(10) Patent No.: US 7,612,834 B2
(45) Date of Patent: Nov. 3, 2009

(54) PARALLAX BARRIER, MULTIPLE DISPLAY DEVICE AND PARALLAX BARRIER MANUFACTURING METHOD

(75) Inventors: Kazunori Tanimoto, Kizugawa (JP); Tatsuji Saitoh, Kobe (JP)

(73) Assignee: Sharp Kabushiki Kaisha, Osaka (JP)

( * ) Notice: Subject to any disclaimer, the term of this patent is extended or adjusted under 35 U.S.C. 154(b) by 168 days.

(21) Appl. No.: 11/995,146

(22) PCT Filed: Jun. 26, 2006

(86) PCT No.: PCT/JP2006/312722
§ 371 (c)(1),
(2), (4) Date: Jan. 9, 2008

(87) PCT Pub. No.: WO2007/013249
PCT Pub. Date: Feb. 1, 2007

(65) Prior Publication Data
US 2009/0080099 A1 Mar. 26, 2009

(30) Foreign Application Priority Data
Jul. 25, 2005 (JP) .............................. 2005-215009

(51) Int. Cl.
*G02F 1/1335* (2006.01)
*G02F 1/1333* (2006.01)
(52) U.S. Cl. ........................................ 349/15; 349/110
(58) Field of Classification Search .................. 349/15, 349/110
See application file for complete search history.

(56) References Cited
U.S. PATENT DOCUMENTS 6,392,690 B1 * 5/2002 Fujii et al. ..................... 348/59
7,336,326 B2 * 2/2008 Kim et al. ..................... 349/95
2004/0119896 A1 * 6/2004 Kean et al. ..................... 349/25
2009/0040426 A1 * 2/2009 Mather et al. ................. 349/65

FOREIGN PATENT DOCUMENTS

GB 2 405 516 A 3/2005
GB 2 405 517 A 3/2005

(Continued)

OTHER PUBLICATIONS

Official communication issued in the International Application No. PCT/JP2006/312722; mailed on Jul. 25, 2006.

*Primary Examiner*—Mike Qi
(74) *Attorney, Agent, or Firm*—Keating & Bennett, LLP

(57) ABSTRACT

A parallax barrier is manufactured by forming a light-blocking layer by patterning a metal layer or a resin layer on a barrier glass in a photolithography step. On a mask used in the photolithography step, some pitches between slits are different, the slits corresponding to portions whereupon the light-blocking layers are to be formed. In addition, on the mask, first pitches (for instance, 100) and second pitches (for instance 99.5), which can be actually formed with accuracy, are formed in a cycle, and the average of such pitches can be accord with a theoretical pitch distance (for instance, 99.99). Thus, in the parallax barrier to be used for a multiple display device, visibility of the entire screen can be improved, and the parallax barrier which can be manufactured by using the mask lithography technology having a limited accuracy, and a method for manufacturing such parallax barrier are provided.

7 Claims, 9 Drawing Sheets

■ BLOCKING AREA
☐ TRANSMISSIVE AREA
▨ FIRST IMAGE
▧ SECOND IMAGE

FOREIGN PATENT DOCUMENTS

| | | |
|---|---|---|
| GB | 2 405 518 A | 3/2005 |
| GB | 2 405 542 A | 3/2005 |
| GB | 2 405 545 A | 3/2005 |
| GB | 2 405 546 A | 3/2005 |
| GB | 2 406 731 A | 4/2005 |
| JP | 8-36145 A | 2/1996 |
| JP | 2005-78094 A | 3/2005 |
| WO | 2005/071474 A2 | 8/2005 |

\* cited by examiner

Slit position on theoretical mask 0.5

In the case where a slit position is moved to the left of the slit position on the theoretical mask In the case where a slit position is moved to the right of the slit position on the theoretical mask

PARALLAX BARRIER, MULTIPLE DISPLAY DEVICE AND PARALLAX BARRIER MANUFACTURING METHOD

BACKGROUND OF THE INVENTION

1. Field of the Invention

The present invention relates to a parallax barrier for use in combination with a display panel and for permitting each different image to be displayed to different display directions of the display panel. The present invention also relates to a multiple display device including the combination of the display panel and the parallax barrier, the multiple display device being capable of displaying each different image to different display directions. The present invention also relates to a method of manufacturing the parallax barrier.

2. Description of the Related Art

There have been proposed display devices that can display each different image to different directions of one display screen (multiple display). Such multiple display devices are proposed as devices having a display panel in combination with a parallax barrier. Technologies of such multiple display devices are disclosed in documents, such as Japanese Unexamined Patent Publication No. 2004-206089 (published on Jul. 22, 2004), Japanese Unexamined Patent Publication No. 2005-78076 (published on Mar. 24, 2005), Japanese Unexamined Patent Publication No. 2005-78080 (published on Mar. 24, 2005), and Japanese Unexamined Patent Publication No. 2005-78094 (published on Mar. 24, 2005).

As illustrated in FIG. 7, in the multiple display device (in FIG. 7, a dual display device is illustrated as an example), a first image and a second image, which are displayed on a display panel 110, are given specific viewing angles by a parallax barrier 120 provided outside the display panel 110. Thereby, as illustrated in FIG. 8, the different images can be displayed to different observers in different observation positions.

The parallax barrier usually includes a light-blocking layer that is formed by patterning a metal layer or a resin layer on a glass substrate or the like. The patterning of the light-blocking layer is carried out by photolithography.

In such a multiple display device including the display panel and the parallax barrier in combination, as illustrated in FIG. 9, a barrier pitch distance of the parallax barrier and a pixel pitch distance of the display panel are almost equal. What is meant by the term "pixel pitch distance of the display panel" herein is a pitch distance between adjacent pixels on the display panel. The term "pixel pitch distance" herein is defined as a pixel pitch distance between the pixels whose viewing angles are controlled in the same direction. In other words, the term "pixel pitch distance" herein is a pixel pitch distance between the pixels on a display image that is displayed to the left, or on a display image that is displayed to the right.

However, in fact, visibility obtained by an arrangement in which the pixel pitch distance and the barrier pitch distance are set so as to be slightly different, is better than visibility obtained by the arrangement in which the pixel pitch distance and the barrier pitch distance are equal. This is described below with reference to FIGS. 10A and 10B.

FIG. 10A illustrates a case wherein a pixel pitch distance and a barrier pitch distance are exactly equal. In this case, viewing angles, which are controlled by a parallax barrier, are uniform over the entire screen, and rays of display light that give the best visibility (solid arrows in FIG. 10A) are parallel to each other over the entire screen.

However, rays of display light that are actually observed by an observer (dashed arrows in FIG. 10A) are not parallel to each other over the entire screen. For example, if the rays of display light from the center of the screen can be observed by the observer with the best visibility, the rays of display light from a peripheral area of the screen cannot be observed by the observer with the best visibility. Therefore, the entire screen visibility for the observer is not uniform.

That is, in order to attain uniform visibility for the observer over the entire screen, it is preferable to provide an arrangement such as that illustrated in FIG. 10B, viewing angles are controlled to be different per each display position by the parallax barrier, so that the rays of display light that can be observed with the best visibility (solid arrows in FIG. 10B) converge to an assumed observation position.

The viewing angle properties illustrated in FIG. 10B can be obtained with the arrangement in which the barrier pitch distance of the parallax barrier and the pixel pitch distance of the display panel are slightly different. More specifically, in the case where a parallax barrier is placed in front of a display panel, the barrier pitch distance is set to be shorter than the pixel pitch distance. Moreover, in the case where parallax barrier is placed behind a display panel (this is possible in the case where the display panel is a transmissive liquid crystal display panel), the barrier pitch distance is set to be longer than the pixel pitch distance.

However, the conventional arrangements described above have the following difficulty in manufacturing the parallax barrier.

That is, in the case where the barrier pitch distance of the parallax barrier and the pixel pitch distance of a display panel are slightly different, the difference in pitch distance between the pixel pitch distance and the barrier pitch distance is extremely small. Therefore, for achieving a desired barrier pitch distance of the parallax barrier, a mask used for achieving the desired barrier pitch distance must be manufactured with extremely high accuracy. Therefore, it is difficult to obtain the mask having the necessary extremely high accuracy using a current mask drawing technology for liquid crystals.

SUMMARY OF INVENTION

In order to overcome the problems described above, preferred embodiments of the present invention provide a parallax barrier used in a multiple display device, wherein the parallax barrier can improve the entire screen visibility and can be manufactured by a mask drawing technology that has limited accuracy.

A parallax barrier according to a preferred embodiment of the present invention preferably is for use in combination with a display panel, and for permitting different images to be displayed respectively to different display directions of the display panel. The parallax barrier preferably includes a light-blocking layer on a transparent substrate, the light-blocking layer having a repeated pattern of pitches, some of which are different from other pitches.

Moreover, a multiple display device according to a preferred embodiment of the present invention includes a matrix-type image-producing device and a parallax barrier attached with the matrix-type image-producing device, the matrix-type image-producing device producing a display image, and the parallax barrier permitting different images to be displayed respectively to different display directions of the matrix-type image-producing device. The parallax barrier includes a light-blocking layer on a transparent substrate, the light-blocking layer having a repeated pattern of pitches, some of which are different from other pitches, and an average pitch distance of which is different from a pixel pitch distance of the matrix-type image-producing device.

A method according to another preferred embodiment of the present invention for manufacturing a parallax barrier for use in combination with a display panel and for permitting different images to be displayed respectively to different display directions of the display panel, includes forming a light-blocking layer on a transparent substrate, the light-blocking layer having a repeated pattern. The step of forming the light-blocking layer includes performing photolithography to pattern a metal layer or a resin layer formed on the transparent substrate. The step of performing the photolithography uses a mask having a repeated pattern of slits arranged with pitches, a portion of which is different from other pitches, the slits corresponding to portions whereon the light-blocking layer is to be formed.

According to the above arrangement, in the mask used for the step of patterning in the step of forming the light-blocking layer of the parallax barrier, even if the limit in mask drawing accuracy cannot achieve a desired barrier pitch distance at each pitch, it is possible to obtain the desired barrier pitch distance on average.

Moreover, in the multiple display device including the image-producing device attached with the parallax barrier having the desired barrier pitch distance, the average pitch distance of the parallax barrier and the pixel pitch of the image-producing device preferably are set to different. As a result, it is possible to display to an observer an image having the uniform visibility over the entire screen.

In addition, the repeated pattern of the light-blocking layer may include first pitches and second pitches positioned in a certain cycle.

With the above arrangement, by setting the first pitch to an easy to manufacture pitch distance that is closest to the desired pitch distance (which is desired based on design theory), viewing angle properties that are as ideal as possible can be obtained on the entire screen. Furthermore, the second pitches absorb barrier pitch errors that are caused by accumulated differences in pitch distance between the first pitches and the desired pitch. Therefore, it is possible to produce a parallax barrier wherein the barrier pitch error in total is substantially none.

Moreover, the repeated pattern of the light-blocking layer may be formed with different kinds of pitches, which are randomly positioned.

According to the above arrangement, the barrier pitch errors do not accumulate in total. Thereby, it is possible to produce a parallax barrier in which barrier pitch error in total is substantially none.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

A preferred embodiment of the present invention is described below with reference to FIGS. 1 to 6. In this preferred embodiment, a liquid crystal display device is described as an example of a multiple display device of the present invention.

Figure 2:
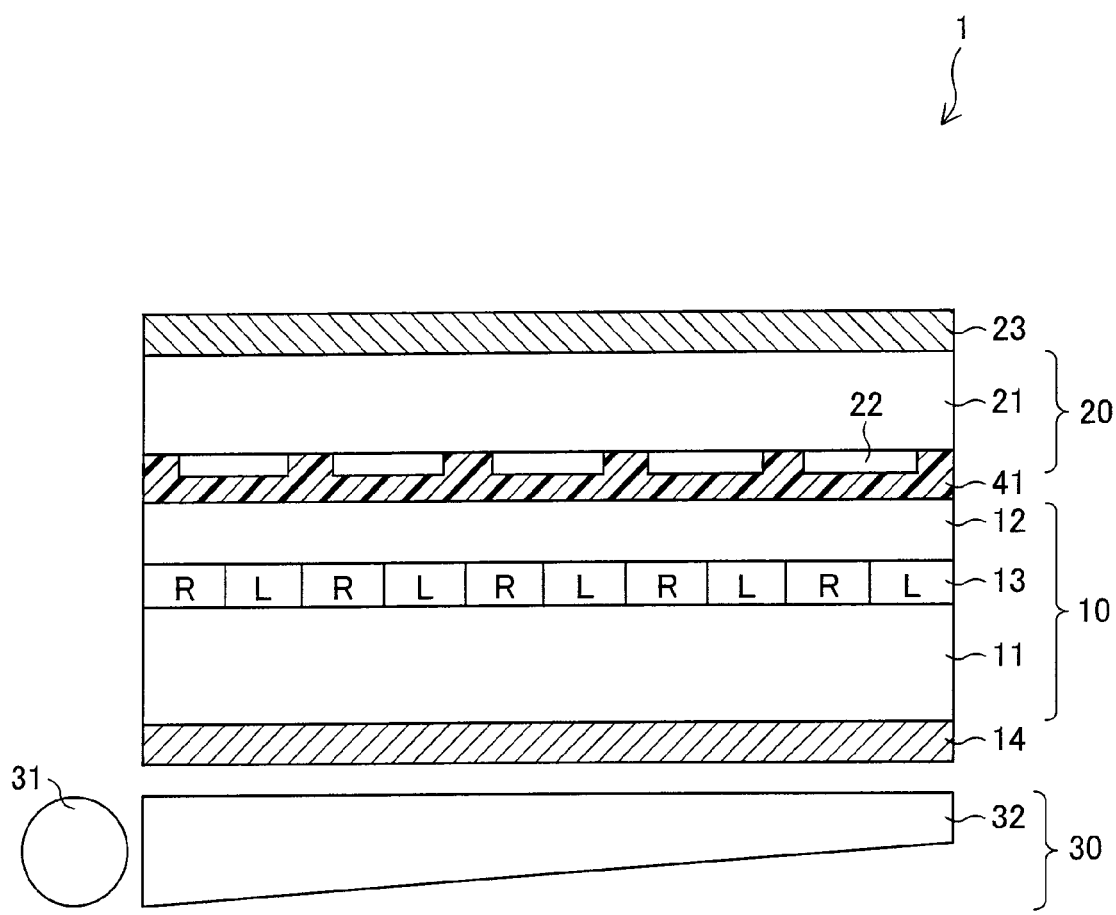
FIG. 2 is a cross-sectional view illustrating a schematic arrangement of a multiple display device according to a preferred embodiment of the present invention.

Firstly, an arrangement of a liquid crystal display device 1 of the present preferred embodiment is schematically illustrated in FIG. 2. As illustrated in FIG. 2, the liquid crystal display device 1 includes, basically, a display panel 10, a parallax barrier 20, and a backlight 30.

The backlight 30 includes a light source 31 and a reflector 32. By reflecting light, which is radiated from the light source 31, to the display panel 10 by the reflector 32, the backlight 30 irradiates light on the display panel 10. The light source 31 may be an LED (light emitting diode), a CCFT (Cold Cathode Florescent Tube), or CCFL (Cold Cathode Fluorescent Lump), for example.

The display panel 10 preferably is an active-matrix-type liquid crystal display panel including a TFT (Thin Film Transistor) substrate 11, a CF (color filter) substrate 12, and a liquid crystal layer 13 made of a nematic liquid crystal between the TFT substrate 11 and the CF substrate 12.

On the TFT substrate 11, data signal lines and scanning signal lines are provided, and signal lines and the scanning signal lines cross each other. At each intersection of the data signal lines and the scanning signal lines, a pixel is provided. As illustrated in FIG. 2, the pixels are arranged so that pixel columns L and pixel columns R are arrayed alternatively with respect to an extension direction of the data signal line (not illustrated). The pixel columns L are provided for displaying images to the left (pixels for displaying images on the left side of the display device) and the pixel columns R are provided for displaying images to the right (pixels for displaying images on the right side of the display device). Moreover, in the liquid crystal display device 1, the TFT substrate 11 preferably has a thickness of about 700 μm, for example.

Moreover, a color filter layer (not illustrated) is provided on the CF substrate 12. The color filter layer preferably provides color elements: red (R), green (G), and blue (B) to each pixel. Furthermore, the CF substrate 12 is preferably thinned to about 50 μm by a chemical etching treatment or a mechanical treatment such as polishing, for example.

Alignment films (not illustrated) are provided respectively on a surface of the TFT substrate 11, which surface faces to the CF substrate 12, and on a surface of the CF substrate 12, which surface faces to the TFT substrate 11. The alignment films have alignment directions substantially perpendicular to each other. In addition, the TFT substrate 11 includes a polarizer 14 on a surface thereof that faces to the backlight 30.

The parallax barrier 20 preferably includes a barrier glass 21 and a barrier-light-blocking layer 22. The barrier glass 21 preferably is a transparent glass which is about 0.7 mm in thickness. The barrier-light-blocking layer 22 is preferably formed by patterning a metal layer or a resin layer on the barrier glass 21. A polarizer 23 is formed on a display-side surface of the barrier glass 21 (the display-side surface is the opposite of that side facing to the backlight 30). Strips of the barrier-light-blocking layer 22 are arranged for example, in a striped column pattern, in parallel or substantially parallel to an extension direction of the pixel columns R/L. The pattern shape of the barrier-light-blocking layer 22 is not particularly limited. Patterns such as in a zigzag pattern or in a delta pattern can be applied. In addition, the material of the barrier-light-blocking layer 22 is not particularly limited. The barrier-light-blocking layer 22 may be made of a light-sensitive resin in which a black pigment is dispersed. It is also possible to form the barrier-light-blocking layer 22 by patterning a metal thin film.

Furthermore, each column of the barrier-light-blocking layer 22 is placed in association with corresponding pixel columns on the display panel 10. That is, the columns of the barrier-light-blocking layer 22 are arranged such that they partially block light coming from each pixel column on the display panel 10, so that a portion of the light cannot be observed from directions other than a display direction of certain pixel columns.

Figure 3:
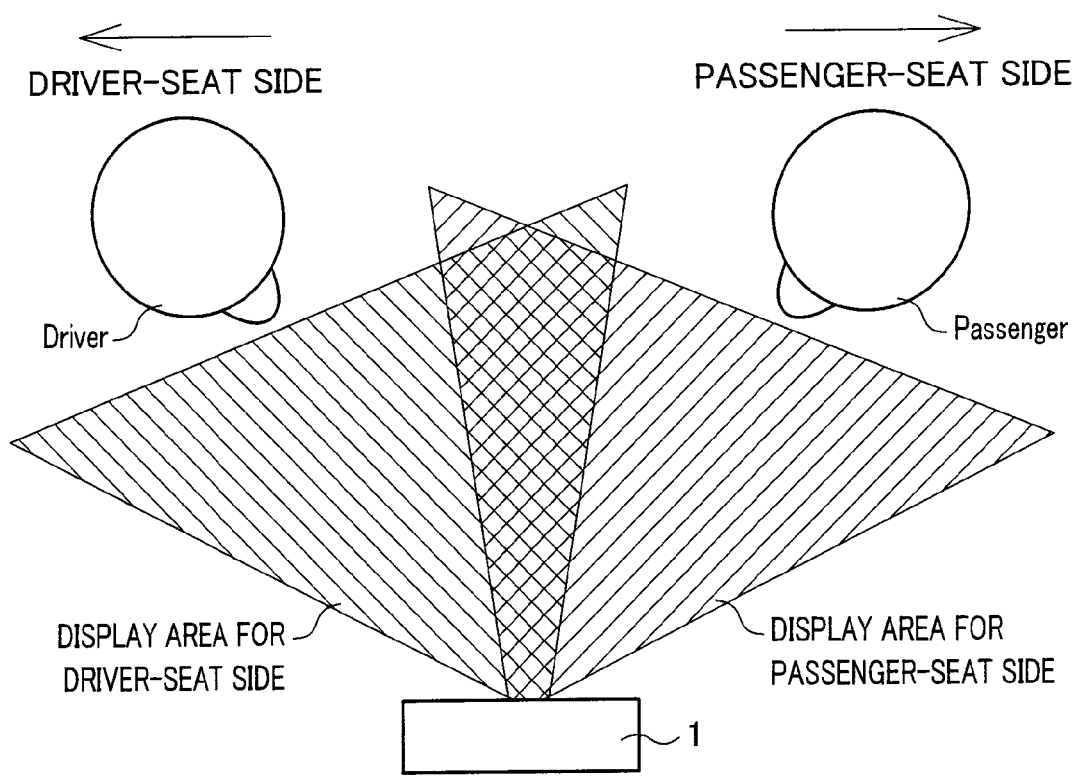
FIG. 3 is an explanatory view illustrating how the multiple display device displays different images to a driver-seat side and to a passenger-seat side, respectively.

Therefore, for example, in the case where the liquid crystal display device 1 is used as a display device in a vehicle as illustrated in FIG. 3, the pixel column R for a driver-seat side can be observed from the driver-seat side but cannot be observed from a passenger-seat side, and the pixel column L for the passenger-seat side can be observed from the passenger-seat side but cannot be observed from the driver-seat side. Therefore, the liquid crystal display device 1 can display different images to the driver-seat side and the passenger-seat side, respectively.

The parallax barrier 20 and the display panel 10 are bonded together preferably with an adhesive layer 41 with a certain distance between them. The adhesive layer 41 is preferably disposed over that entire surface of the parallax barrier 20, which faces toward the display panel 10, and over that entire surface of the display panel 10, which faces to the parallax barrier 20. That is, the parallax barrier 20 and the display panel 10 are bonded together via the entire surfaces thereof. A photo-curable adhesive (for example, an ultraviolet-curable resin) can be used to form the adhesive layer 41. Furthermore, in the liquid crystal display device 1, the adhesive layer 41 preferably has a thickness (a distance between the barrier glass 21 and the CF substrate 12) of about 40 μm, for example.

In addition, it is preferable that a material used for the adhesive layer 41 have a certain degree of elasticity after it is cured.

Furthermore, it is necessary to align the parallax barrier 20 and the display panel 10 correctly, so that the images, which are separated to the right side and to the left side of the liquid crystal display device 1, can be displayed appropriately. Therefore, it is preferable, for example, to put alignment marks respectively on, so that the parallax barrier 20 and the display panel 10 can be aligned correctly referring to the alignment marks.

Next, a design of a mask that is used for forming a parallax barrier 20 is described in detail. In a fabrication process of the multiple display device of the present preferred embodiment, the pixel of the display panel and the light-blocking layer of the parallax barrier are preferably formed by photolithography steps. In addition, the photolithography steps need a mask for pattern exposure.

Figure 10A:
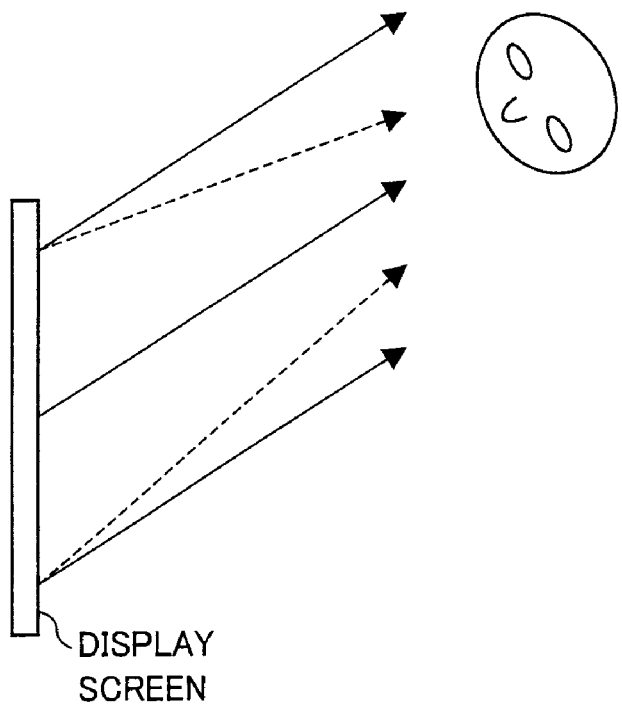
FIG. 10A is a view illustrating viewing angle properties in the case where the pixel pitch of a display panel and the barrier pitch of a parallax barrier are exactly equal in pitch distance.
Figure 10B:
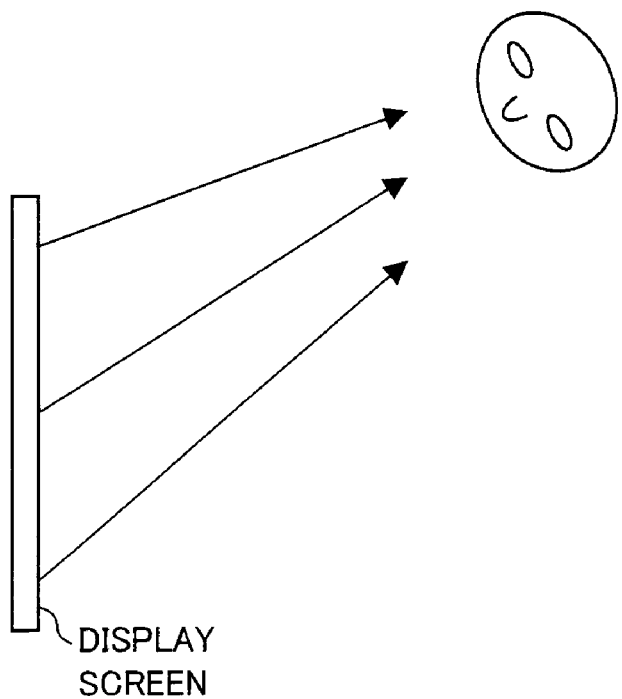
FIG. 10B is a view illustrating viewing angle properties in the case where a pixel pitch of a display panel and a barrier pitch of a parallax barrier are different in pitch distance.

In the multiple display device of the present preferred embodiment, a barrier pitch of the parallax barrier is slightly shorter than a pixel pitch of the display panel, so that the entire screen visibility for an observer is uniform. In other words, the barrier pitch of the parallax barrier is shorter than the pixel pitch of the display panel in the multiple display device of the present preferred embodiment, so that the viewing angle properties illustrated in FIG. 10B are obtained. Therefore, in this case, the masks used in the photolithography steps are designed to form the barrier pitch and the pixel pitch respectively in such manner that the barrier pitch is slightly shorter than the pixel pitch. Here, the "barrier pitch of the mask" is a pitch between slits the mask has.

However, as described above as the conventional problem, a difference in pitch distance between the pixel pitch and the barrier pitch is extremely small. Therefore, it is difficult to produce a mask that can realize a theoretical barrier pitch using the current mask drawing technology for liquid crystal.

For instance, in the case where the pixel pitch distance on the mask for producing the display panel is 100, and the barrier pitch distance on the mask for producing the parallax barrier is 99.9, the mask for forming the parallax barrier should have accuracy of 0.01. On the other hand, if the current mask drawing technology allows only accuracy of 0.5, even when the mask for producing the parallax barrier is desired to have the barrier pitch distance of 99.99, the barrier pitch actually formed on the mask has a pitch distance of either 100 or 99.5.

Figure 4:
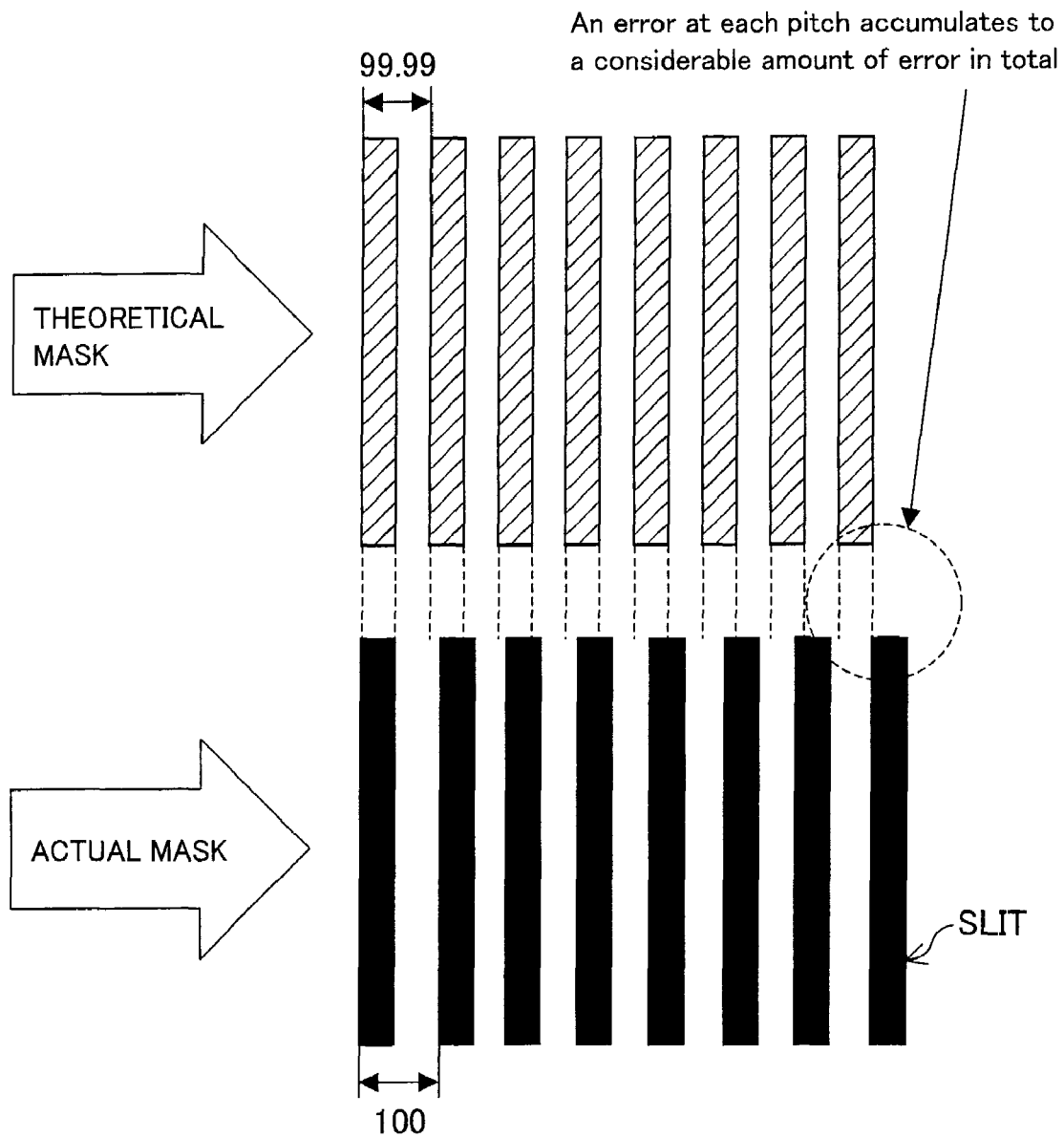
FIG. 4 illustrates a reference example and is a plane view illustrating a comparison between a barrier pitch on a theoretical mask and a barrier pitch on an actual mask that can be manufactured.

FIG. 4 illustrates an example, wherein a barrier pitch on a theoretical mask has a pitch distance of 99.99, but a barrier pitch on a mask that is actually manufactured has a pitch distance of 100. Therefore, an error of 0.01 is generated for each pitch. Each error accumulates on the mask as a whole. Thus, the amount of the errors in total is considerable. As a result, it is not possible to obtain the desired viewing angle properties if a light-blocking layer of a parallax barrier is formed by patterning with this mask. Of course, a mask having a barrier pitch distance of 99.5 cannot provide the desired viewing angle properties.

Therefore, in the present preferred embodiment, barrier pitches on the mask for forming the parallax barrier are not formed at regular intervals, and the mask has correcting points for correcting the error at appropriate positions, so that errors in total are eliminated (or reduced). A specific example is described below referring to FIG. 1.

Figure 1:
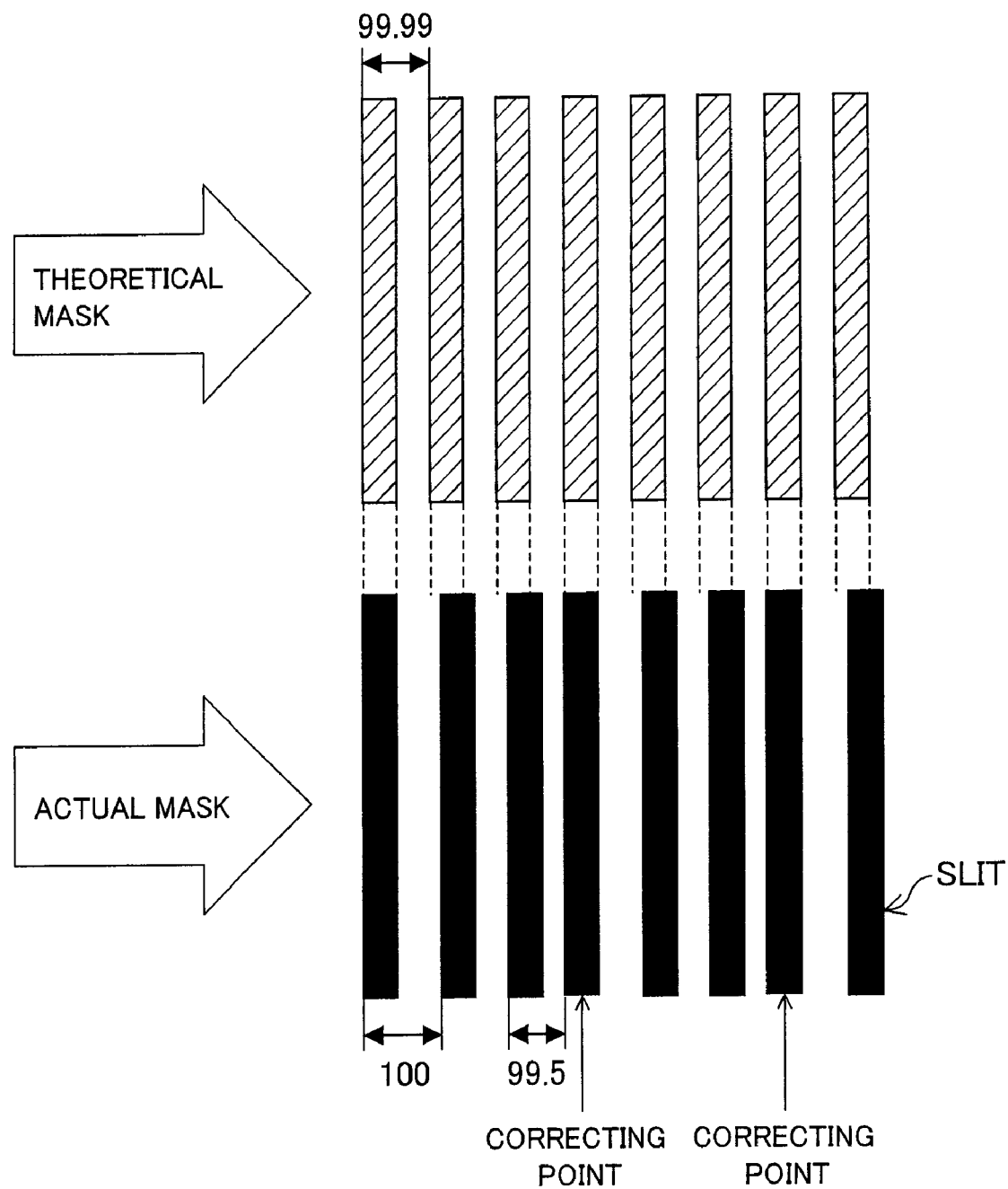
FIG. 1 illustrates a preferred embodiment of the present invention and is a plane view illustrating a comparison between a barrier pitch on a theoretical mask and a barrier pitch on an actual mask that can be manufactured.

In the example illustrated in FIG. 1, a theoretical barrier pitch distance is 99.99, on the other hand, an actual barrier pitch (the actual barrier pitch distance is 100, which is feasible to form in reality, and is closest to a theoretical barrier pitch distance). However, as described above, if all barrier pitches are formed to have the pitch distance of 100, an error of 0.01 is generated per barrier pitch. As a result, each error accumulates on the mask as a whole. Therefore, in the example illustrated in FIG. 1, the correcting point is placed every 50 pitches. At the correcting point, a barrier pitch between slits is 99.5. Therefore, at the correcting points, the accumulated errors caused at the pitches other than the pitches at the correcting points are eliminated. As a result, it is possible to produce a mask whereon barrier pitch error in total is substantially none. Eventually, it is possible to produce a parallax barrier in which barrier pitch error in total is substantially none.

In the case where a parallax barrier has a light-blocking layer formed by the mask illustrated in FIG. 1, the parallax barrier has non-constant or variable barrier pitches. Specifically, the light-blocking layer of the parallax barrier has first pitches and second pitches positioned in a certain cycle, where the first pitches are formed by the barrier pitches of the pitch distance of 100 on the mask and the second pitches are formed by the barrier pitches of the pitch distance of 99.5 on the mask. Therefore, even if the limit in the mask drawing accuracy cannot achieve a desired barrier pitch distance at each pitch, it is possible to obtain the desired barrier pitch distance on an average. That is, by setting the first pitch to an easy to manufacture pitch distance that is closest to the desired pitch distance (which is desired on design theory), viewing angle properties that are as ideal as possible can be obtained on the entire screen. Furthermore, the second pitches absorb the errors that are caused by accumulated differences in pitch distance between the first pitches and the desired pitch.

With this arrangement, in a multiple display device comprising a display panel, a parallax barrier that is produced by the method of the present preferred embodiment can be produced such that an average barrier pitch distance of the parallax barrier and a pixel pitch distance of the display barrier are different in a desired ratio (99.99:100 in the example of FIG. 1).

Therefore, as illustrated in FIG. 10B, the multiple display device of the present preferred embodiment can be arranged so that the parallax barrier produces different viewing angles at different display positions. Thereby, rays of display light that can achieve the best visibility converge to an assumed observation position. As a result, it is possible to provide an observer with the uniform visibility over the entire screen.

Figure 5:
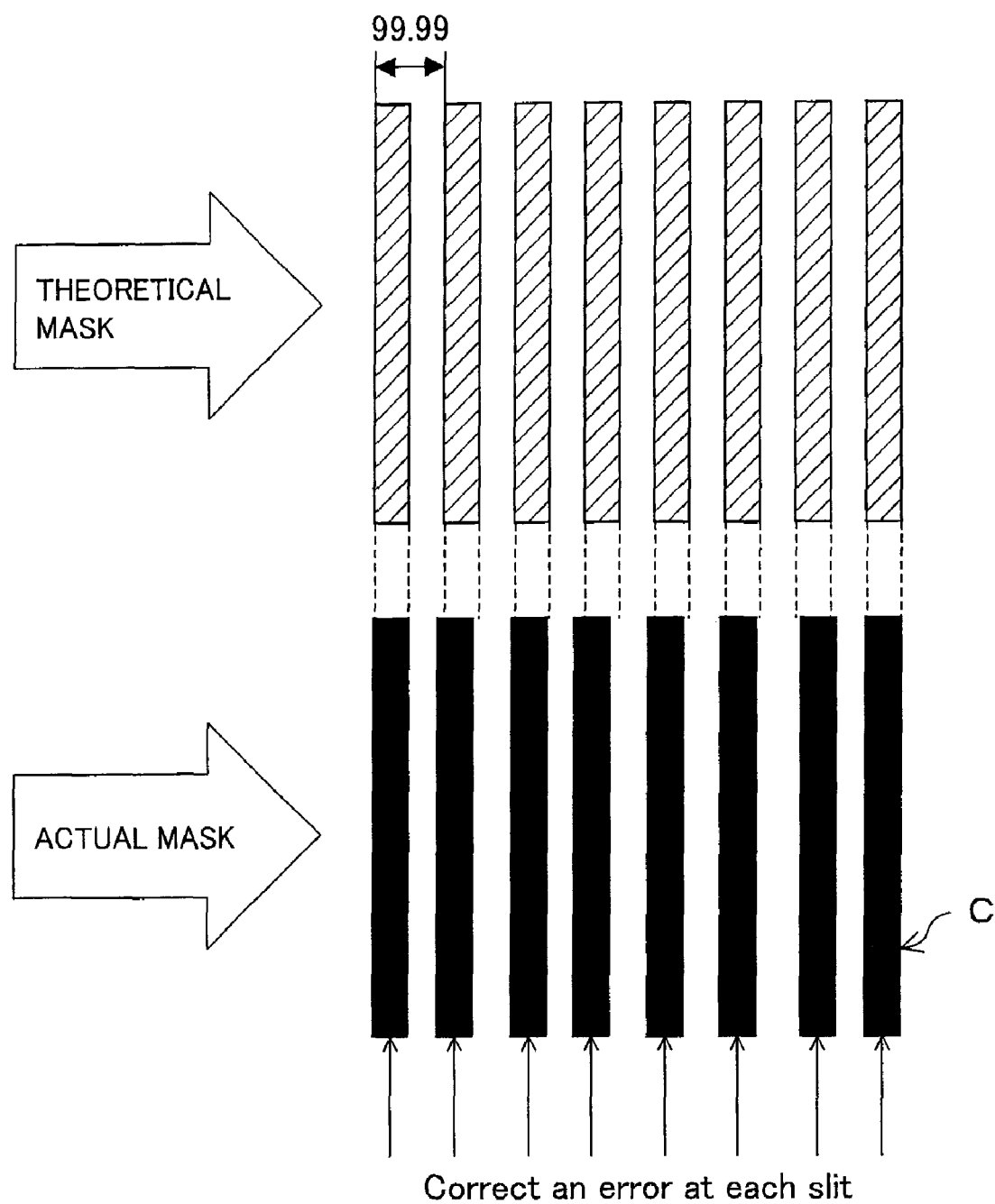
FIG. 5 illustrates a modification of preferred embodiments of the present invention and is a plane view illustrating a comparison between a barrier pitch on a theoretical mask and a barrier pitch on an actual mask that can be manufactured.
Figure 6:
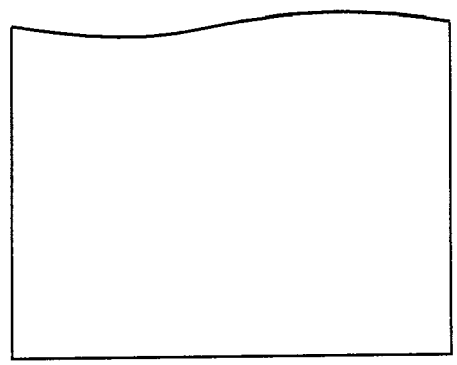
FIG. 6 is a plane view illustrating a comparison between a slit position on a theoretical mask and a slit position on an actual mask that can be manufactured.
Figure 6:
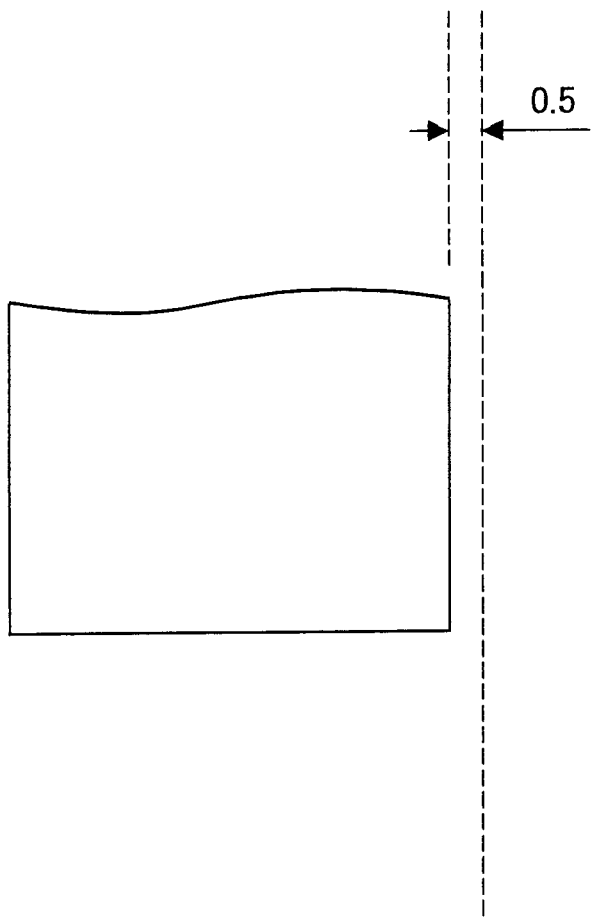
Figure 6:
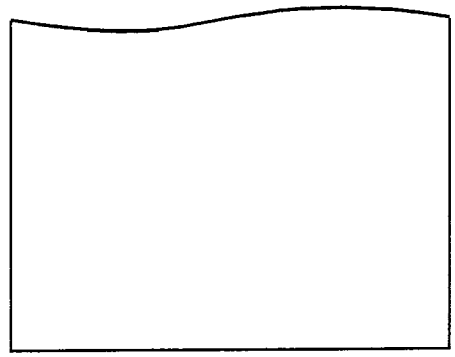
Figure 7:
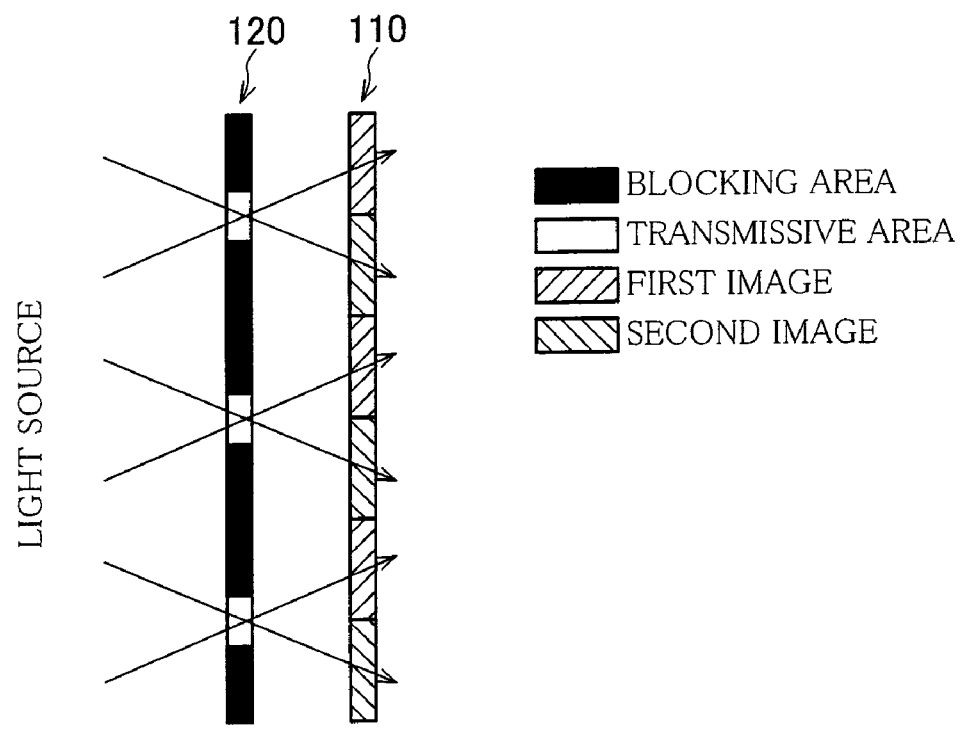
FIG. 7 is a view illustrating how viewing angles achieved by a parallax barrier affect display in a multiple display device.
Figure 8:
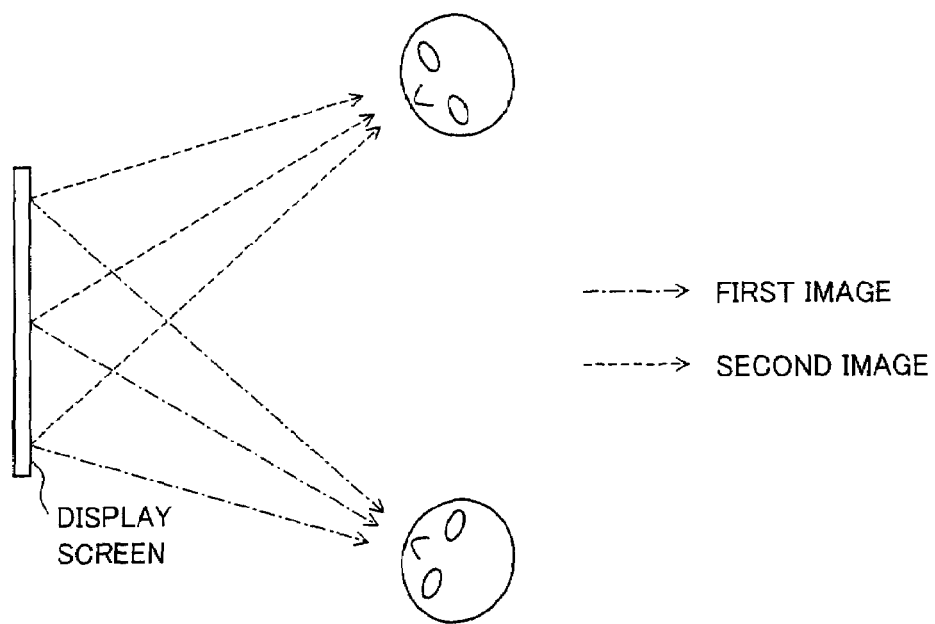
FIG. 8 is a view illustrating a relationship between a display screen that displays multiple images and observers of the multiple images.
Figure 9:
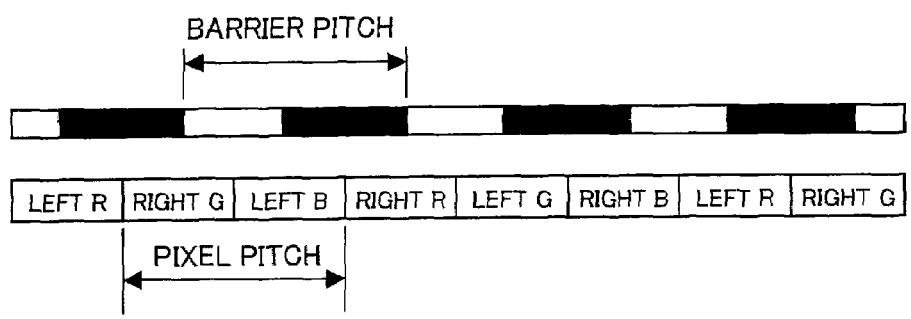
FIG. 9 is a view schematically illustrating a relationship between the pixel pitches of the display panel and the barrier pitches of the parallax barrier.

Meanwhile, according to the arrangement of the mask illustrated in FIG. 1, the correcting points are formed periodically. Therefore, the parallax barrier which is formed by using the mask may cause image irregularities such as moiré. The present invention may be modified such that the mask for producing the parallax barrier may have another arrangement as illustrated in FIG. 5, in order to prevent the image irregularities caused by the periodicity of the barrier pitches. In the example illustrated in FIG. 5, a correcting point is provided at every slit, and the amount of error to be corrected at each correcting point is set randomly. This example is specifically explained below with reference to FIG. 6. In addition, in FIGS. 5 and 6, it is assumed that a theoretical barrier pitch distance is 99.99 and attainable drawing accuracy is 0.5.

A slit on an actually designable mask is formed to be located either slightly to the left side or slightly to the right side of the corresponding slit on a theoretical mask. In the example of FIG. 5, a position of each slit on the mask that is capable of being manufactured is set randomly, whether to be formed slightly to the left side or slightly to the right side of the corresponding slit on the theoretical mask. In this case, each barrier pitch is randomly formed to have any one of pitch distances of 99.5, 100, and 100.5. However, because the position is basically corrected at each slit, the barrier pitch errors do not accumulate as a whole. As a result, it is possible to produce a mask on which barrier pitch error in total is substantially none. Eventually, it is possible to produce a parallax barrier wherein barrier pitch error in total is substantially none. In addition, in the arrangement of FIG. 5, the barrier pitches are generated randomly. Therefore, different kinds of barrier pitches are randomly formed in the light-blocking layer of the parallax barrier. Therefore, the periodicity of the barrier pitches illustrated in FIG. 1 is not generated in the arrangement of FIG. 5. As a result, the moiré or other image irregularities, which are caused by the periodicity of the barrier pitches, can be prevented.

In addition, the multiple display device of the present invention is not limited to liquid crystal display devices, which the above explanation refers to. Apart from the liquid crystal display panel, the display panel for use in combination with the parallax barrier may be a PDP panel or an organic EL panel, for example.

As described above, the parallax barrier according to a preferred embodiment of the present invention is arranged so that a light-blocking layer having a repeated pattern is formed on a transparent substrate, and pitches of the light-blocking layer are irregular.

Furthermore, a multiple display device according to a preferred embodiment of the present invention includes a matrix-type image-producing device and a parallax barrier attached with the matrix-type image-producing device, the matrix-type image-producing device producing a display image. The multiple display device according to a preferred embodiment of the present invention is arranged such that an average barrier pitch distance of the parallax barrier is different from a pixel pitch distance of the image-producing device.

Furthermore, the parallax barrier may be arranged such that the repeated pattern of the light-blocking layer includes first pitches and second pitches positioned in a certain cycle.

Furthermore, the parallax barrier may be arranged such that the repeated pattern of the light-blocking layer is formed with different kinds of pitches, which are randomly positioned.

In addition, a method according to a preferred embodiment of the present invention for manufacturing a parallax barrier includes forming a light-blocking layer on a transparent substrate, the light-blocking layer having a repeated pattern. The method is performed such that the step of forming includes performing photolithography to pattern a metal layer or a resin layer formed on the transparent substrate, and the step of performing the photolithography uses a mask having a repeated pattern of slits in pitches, a portion of which is different from other pitches, the slits corresponding to portions whereon the light-blocking layer is to be formed.

With this arrangement, it is possible to manufacture a parallax barrier used in a multiple display device in which the parallax barrier can improve visibility of the entire screen. Moreover, the parallax barrier can be manufactured by a mask drawing technology with limited accuracy.

Furthermore, the present invention may be modified various ways, provided that the modification is not out of the scope of the main characteristics thereof described above. Therefore, the preferred embodiments described above are merely examples in every respect and should not be construed to limit the scope of the present invention. The scope of the present invention shall be construed referring to the recitation in claims and shall not be limited by the text of the DESCRIPTION. Furthermore, changes, modifications, and processes equivalent to what are claimed in the claims below are also included within the scope of the present invention.

The present invention relates to a multiple display device and a parallax barrier for use in combination with a display panel. By using the parallax barrier, each different image is displayed to different display directions of the display panel. The present invention is applicable to multiple display devices such as a liquid crystal display panel, a PDP panel, an organic EL panel, and other panels.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A parallax barrier for use in combination with a display panel and for permitting different images to be displayed respectively to different display directions of the display panel, the parallax barrier comprising:
   a light-blocking layer on a transparent substrate, the light-blocking layer having a repeated pattern arranged at pitches; wherein
   some of the pitches are different from others of the pitches.

2. The parallax barrier as set forth in claim 1, wherein the repeated pattern of the light-blocking layer includes first pitches and second pitches which are arranged in a certain cycle.

3. The parallax barrier as set forth in claim 1, wherein the repeated pattern of the light-blocking layer includes different kinds of pitches, which are randomly positioned.

4. A multiple display device comprising:
   a matrix-type image-producing device arranged to generate a display image; and
   a parallax barrier attached with the matrix-type image-producing device arranged to permit different images to be displayed respectively to different display directions of the matrix-type image-producing device; wherein
   the parallax barrier includes a light blocking layer on a transparent substrate, the light-blocking layer having a repeated pattern of pitches, some of the pitches being different from other pitches, and an average pitch distance of which is different from a pixel pitch distance of the matrix-type image-producing device.

5. The multiple display device as set forth in claim 4, wherein the repeated pattern of the light-blocking layer includes first pitches and second pitches positioned in a certain cycle.

6. The multiple display device as set forth in claim 4, wherein the repeated pattern of the light-blocking layer includes different kinds of pitches, which are randomly positioned.

7. A method of manufacturing a parallax barrier for use in combination with a display panel and for permitting different images to be displayed respectively to different display directions of the display panel, the method comprising the steps of:
   forming a light-blocking layer on a transparent substrate, the light-blocking layer having a repeated pattern; wherein
   the step of forming the light-blocking layer includes performing photolithography to pattern a metal layer or a resin layer formed on the transparent substrate; and
   the step of performing the photolithography includes using a mask having a repeated pattern of slits arranged at pitches, some of the pitches being different from other pitches, the slits corresponding to portions where the light-blocking layer is to be formed.

* * * * *